United States Patent
Thomas et al.

(10) Patent No.: US 6,622,909 B1
(45) Date of Patent: Sep. 23, 2003

(54) MINING DATA FROM COMMUNICATIONS FILTERING REQUEST

(75) Inventors: Carol R. Thomas, Murrieta, CA (US); Michael L. Reed, San Diego, CA (US)

(73) Assignee: NCR Corporation, Dayton, OH (US)

( * ) Notice: Subject to any disclaimer, the term of this patent is extended or adjusted under 35 U.S.C. 154(b) by 133 days.

(21) Appl. No.: 09/695,358

(22) Filed: Oct. 24, 2000

(51) Int. Cl.[7] .............................................. G06F 17/00
(52) U.S. Cl. ........................ 235/375; 235/376; 709/201
(58) Field of Search ................................ 235/375, 376, 235/462.01; 709/200, 201, 206

(56) References Cited

U.S. PATENT DOCUMENTS

| | | | | |
|---|---|---|---|---|
| 5,507,131 A | * | 4/1996 | Schluger | 53/460 |
| 5,619,648 A | | 4/1997 | Canale et al. | |
| 5,826,022 A | | 10/1998 | Nielsen | |
| 5,918,214 A | * | 6/1999 | Perkowski | 235/375 |
| 6,023,723 A | | 2/2000 | McCormick et al. | |
| 6,047,327 A | | 4/2000 | Tso et al. | |
| 6,052,709 A | | 4/2000 | Paul | |
| 6,073,112 A | | 6/2000 | Geerlings | |
| 6,073,167 A | * | 6/2000 | Poulton et al. | 709/206 |
| 6,112,227 A | | 8/2000 | Heiner | |
| 6,161,130 A | * | 12/2000 | Horvitz et al. | 709/206 |
| 6,370,526 B1 | * | 4/2002 | Agrawal et al. | 707/5 |

* cited by examiner

*Primary Examiner*—Daniel St. Cyr
(74) *Attorney, Agent, or Firm*—Baker Botts L.L.P.

(57) ABSTRACT

A system and computer-based method are disclosed for use in mining data from communications filtering requests. The system and method accept from a delivery point a filtering request, which includes an identification of a sender from which the delivery point does not wish to accept communications. Data from the filtering request is stored in a database and information from the database is provided to a requester. The system and method may receive a communication, determine from the communication its source and its delivery point, access the database to determine if the determined delivery point wishes to accept communications from the determined source and, if it does, deliver the communication to the delivery point. Otherwise, the system and method discard the communication. In the case of traditional mail, the system and method may determine the source and delivery point from one or more bar codes.

29 Claims, 6 Drawing Sheets

FIG. 6

DELIVERY POINT BAR CODE (EXISTING)

| FIELD | # BARS |
|---|---|
| BEGINNING FRAME BAR | 1 |
| ZIP CODE (5 DIGITS) | 25 |
| +4 CODE (4 DIGITS) | 20 |
| DELIVERY POINT (2 DIGITS) | 10 |
| CORRECTION CHARACTER | 5 |
| ENDING FRAME BAR | 1 |
| TOTAL | 62 |

602

SENDER ID BAR CODE

604

| FIELD | # BARS |
|---|---|
| BEGINNING FRAME BAR | 1 |
| ZIP CODE (5 DIGITS) | 25 |
| SENDER ID (6 DIGITS) | 30 |
| CORRECTION CHARACTER | 5 |
| ENDING FRAME BAR | 1 |
| TOTAL | 62 |

MINING DATA FROM COMMUNICATIONS FILTERING REQUEST

BACKGROUND

People and businesses are frequently inundated with information they do not want and do not need. For example, a large percentage of the mail people and businesses receive is "junk" mail which is mailed out by mail senders in bulk quantities as announcements, advertisements or other forms of solicitations. The junk mail may be associated with a product or service that the recipient does not want or need and will never want or need.

Similarly, a significant portion of the emails that a person or business receives may comprise "spam" (the email equivalent to junk mail), and unwanted joke or gossip emails. Further, a person's or business's productivity may be diminished by the amount of time required to answer unwanted telephone calls, such as those from telemarketers.

Some telephone companies offer services, such as call blocker, which allow a consumer to block telephone calls from a specified telephone number. Similarly, some email systems can be configured to filter out emails from specific sources.

SUMMARY

In general, in one aspect, the invention features a computer-based method for use in mining data from communications filtering requests. The method includes accepting from a delivery point a filtering request, which includes an identification of a sender from which the delivery point does not wish to accept communications. The method further includes storing the data from the filtering request in a database and providing information from the database to a requestor.

Implementations of the invention may include one or more of the following. The communications may be one of traditional mail, email, and telephonic communications. Providing information may include accepting a data mining request from the requestor and mining data from the database in accordance with the data mining request. Providing information may include receiving from the requestor payment associated with the data mining request.

The method may further include receiving from the delivery point payment associated with the filtering request. The payment may be associated with receipt of the filtering request or with application of the filtering request. The requestor may be the sender. Providing information may include querying the database for a list of all delivery points not accepting communications from the requester.

The method may further include sending filtered communications to a recycle facility and receiving from the recycle facility payment associated with receipt of the filtered communications.

The method may further include receiving a communication, determining from the communication its source and its delivery point, accessing the database to determine if the determined delivery point wishes to accept communications from the determined source, and if it does, delivering the communication to the delivery point. If it does not, the method may include discarding the communication. Determining the source and delivery point may include reading one or more bar codes affixed to an article of traditional mail.

In general, in another aspect, the invention features a system for mining data from a communications filtering system. The system for mining data includes a database, a filtering request interface for receiving a filtering request, a data mining request interface for receiving a data mining request, and a data mining response interface for transmitting a data mining response. The system also includes a processor configured to process the filtering request to produce filtering request data, store at least a portion of the filter request data in the database, mine the database in accordance with the data mining request to produce a data mining response, and provide the data mining response through the data mining response interface.

Implementations of the invention may include one or more of the following. The processor may be further configured to filter communications in accordance with the filtering request. The system may further include a revenue interface configured to receive revenue associated with one or more of the filtering request, the data mining request, the data mining response, and the communications filtering activity. The system may further include a filtered communications interface through which the processor sends filtered communications. The filtered communications interface may be to a recycling facility. The system may further include a revenue interface configured to receive revenue associated with sending the filtered communications to the recycling facility.

The filtering request may include an identification by a delivery point of a sender from which the delivery point does not wish to receive communications. The filtering request may include an indication by a delivery point that the delivery point does not wish to receive bulk communications. The bulk communications may include one of bulk mail, bulk email, and bulk telephone calls. The filtering request may include a payment.

The data mining request may include a request for information regarding specified delivery points. The data mining request may include a request for an identification of delivery points that have asked not to receive communications from a sender. The data mining request may include a request from a requester of an identification of delivery points that have asked not to receive communications from the requester. The data mining request may include a payment. The data mining response may include a list of delivery points that have asked not to receive communications from a sender.

In general, in another aspect, the invention features a computer-based method for filtering traditional mail including receiving an article of traditional mail, determining a delivery point from the article of traditional mail, determining a sender from the article of traditional mail, discarding the article of traditional mail if the delivery point does not wish to receive traditional mail from the sender, and otherwise forwarding the article of traditional mail to the delivery point.

Implementations of the invention may include one or more of the following. Determining a sender may include reading a bar code. The bar code may include a zip code and a sender identification associated with the zip code.

The method may further include determining whether the delivery point wishes to receive traditional mail from the sender by accessing a database. The method may further include receiving a filtering request, which includes filtering data, and storing at least a portion of the filtering data in a database. The method may further include receiving a data mining request and accessing a database containing information regarding whether the delivery point wishes to receive traditional mail from the sender in order to extract mined data in accordance with the data mining request, and producing a report based on the mined data in accordance with the data mining request.

In general, in another aspect, the invention features a method for filtering mail which includes creating a unique sender code for each sender of mail, creating a filter list of sender codes identifying senders from which a customer does not wish to receive mail, and withholding delivery of an article of mail for which the sender code matches a code on the filter list.

Implementations of the invention may include one or more of the following. The method may include finding the sender code on the article of mail. Creating the unique sender code may include creating a bar code. Creating the unique sender code may include creating a bar code including a sender identification that is unique for the zip code associated with the address of the sender.

In general, in another aspect, the invention features a method for filtering communications including asking a customer to identify one or more senders from which the customer no longer wishes to receive communications and avoiding delivery of communications to the customers from the one or more identified senders.

Implementations of the invention may include one or more of the following. Avoiding delivery may include asking the one or more identified senders not to send communications to the customer. Avoiding delivery may include blocking delivery of communications to the customer from the one or more identified senders.

BRIEF DESCRIPTION OF THE DRAWINGS

FIG. 6 is a table illustrating a Delivery Point Bar Code and a Sender ID Bar Code.

DETAILED DESCRIPTION

A filtering and mining system builds a database from filtering requests. The system filters the communications it receives, discarding selected communications in accordance with the filtering requests. The system also receives data mining requests, mines the database in accordance with the data mining requests, and produces responses to the data mining requests. The system optionally accepts payments for some or all of the services it performs.

Figure 1:
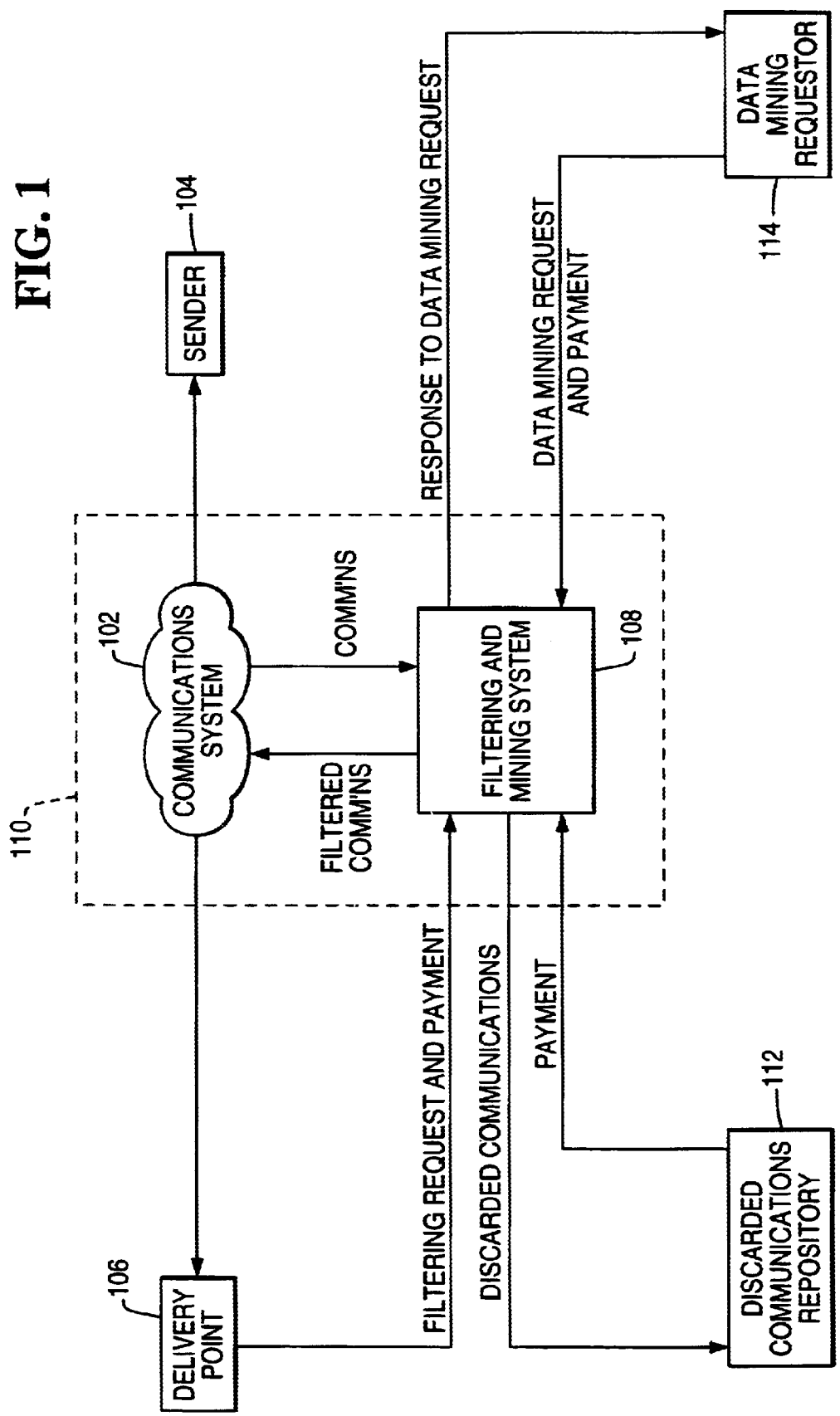
FIG. 1 is a block diagram of a communications system and entities that interface with it.

A communications system 102, illustrated in FIG. 1, receives communications from a sender 104. The communications system 102 may be any system that transfers communications from one place to another. For example, the communications system 102 may be a traditional mail system. The term "traditional mail" is defined to mean any form of non-electronic communication, such as (a) the services provided by the United States Postal Service and other governments around the world; and (b) the services provided by courier services. In that case, the sender 104 may be a person, business or computer sending a single item of mail or a large quantity of mail (i.e. bulk mail), or anything in between.

The communications system 102 may be an email system. In that case, the sender 104 may be a person, business or computer sending a single email message or a large number of email messages (e.g., spam) or anything in between.

The communications system 102 may be a telephone system. In that case, the sender may be a person, business or computer making a single telephone call or a large number of telephone calls (i.e. telemarketing) or anything in between.

In any case, each communication initiated by the sender 104 is intended to be delivered to a delivery point 106. In the case of traditional mail, the delivery point 106 is specified by an address affixed to the communication (i.e. article of mail). In some cases, the delivery point 106 is specified through the use of a bar code, such as the POSTNET Barcode used by the United States Postal Service. The sender 104 may also be identified on the communication.

In the case of email, the delivery point 106 is specified by a destination address associated with each email message. In many cases, the sender 104 is specified by a source address associated with each email message.

In the case of telephonic communications, the delivery point 106 is specified when the sender 104 enters a telephone number to be called. In some cases, an identification of the sender is provided to the delivery point 106 when the call is initiated, which enables such services as caller identification.

The communications system 102 may be coupled to a filtering and mining system 108, which filters communications and mines data collected during the filtering process. The filtering and mining system 108 may be a standalone system with an interface to the communications system 102 or, alternatively, it may be part of the communications system 102, as indicated by box 110.

For example, in the case of traditional mail, the communications system 102 may be the mail system, including the United States Postal Service and similar systems throughout the world. In the United States, the filtering and mining system 108 may be at a Regional Post Office, where mail is sorted before it is sent to Local Post Offices. In that case, the filtering and mining system 108 is part of the communications system 102 because the Regional Post Office is part of the United States Postal Service.

Alternatively, the Regional Post Office may choose to divert all or part of the mail it receives to an outside contractor, which will perform the filtering and mining function. In that case, the filtering and mining system 108 is not part of the communications system 102.

To initiate the filtering process, the delivery point 106 sends a "filtering request" to the filtering and mining system 108. In some cases, the filtering and mining system 108 may solicit filtering requests from the delivery point 106. Optionally, the filtering and mining system 108 also receives a payment from the delivery point 106 for the filtering request.

Typically, the filtering request will at least specify a sender 104 or senders from which the delivery point 106 does not wish to receive communications. For example, in the traditional mail context, a delivery point 106 may specify that it does not wish to receive bulk mail from a specified sender 104 or senders or, more broadly, that it does not wish to receive bulk mail from any sender. Further, a filtering request may modify or withdraw a previous filtering request.

To illustrate, the delivery point 106 may register a first filtering request to block communications from the sender 104. Subsequently, the delivery point 106 may register a second filtering request rescinding the first filtering request.

Further, the filtering requests may contain data about the people or businesses that reside at the delivery point. For example, if the delivery point is a home, the filtering request may include the names, age ranges, yearly income, professions and a variety of other information regarding the persons residing in the home. If the delivery point is a business, the filtering request may include the name of the business, the type of business it conducts and a variety of other information regarding the business.

The filtering and mining system 108 retains in a database the data it receives in the filtering requests. As can be appreciated such a database could grow to be very large very quickly, consuming many terabytes (TB) of storage. Therefore, a highly scalable data warehousing system that is capable of managing large amounts of data (e.g., hundreds or even thousands of terabytes) is best suited for use in storing the data collected by the filtering and mining system 108. The Teradata Active Data Warehouse system offered by NCR Corporation is one example of such a data warehousing system.

In response to the filtering request, the filtering and mining system 108 filters the communications it receives from the communications system 102. The filtering and mining system 108 allows designated communications to be delivered to their respective delivery points 106 and sends discarded communications to a discarded communications repository 112. Optionally, the discarded communications repository 112 sends a payment to the filtering and monitoring system 108 for the discarded communications.

In another approach, the filtering and mining system 108 filters communications by sending a request to a designated sender 104 not to send communications to a designated delivery point 106. In this approach, the communications are filtered by not being sent.

For example, in the traditional mail system, a person or business (the delivery point 106) may decide that it no longer wishes to receive mail from a particular bulk mailer (sender 104). To accomplish this, the person or business registers a filtering request with the filtering and mining system 108, which is part of the United States Postal Service (communications system 102). In response, the United States Postal Service filters all mail from the designated bulk mailer addressed to the designated person or business and, optionally, sends the filtered mail to a recycle center (discarded communications repository 112). The recycle center may send a payment to the filtering and mining system 108 for the filtered mail. Alternatively, the United States Postal Service may send a request to the designated bulk mailer not to send mail to the person or business that initiated the filtering process.

The filtering and mining system 108 provides a data mining function. "Data mining" refers to extracting data from generally, but not necessarily, large databases. The filtering and mining system 108 receives data mining requests from a data mining requestor 114. The filtering and mining system 108 mines the filtering data in the database discussed above in accordance with the data mining request and provides a response to the data mining requestor 114.

For example, in the traditional mail system, the data mining requester 114 may be a bulk mailer seeking information regarding all addresses (e.g., delivery point 106) that have indicated that they do not wish to receive mail from the bulk mailer. In this situation, the data mining requestor 114 is also a sender 104. With this information, the bulk mailer could avoid the cost of preparing and mailing bulk mail to the addresses that have already indicated that they do no wish to receive mail from the bulk mailer. From an environmental perspective, the bulk mailer could avoid the environmental impact caused by bulk mail it originates being filtered and sent to the discarded communications repository 112.

Further, the data mining requestor 114 may not be a sender but may be a person or business interested in the data stored by the filtering and mining system 108. For example, the data stored by the filtering and mining system 108 may be useful in studying consumer buying preferences. A data mining requestor 114 with the information that a delivery point 106 has registered a filtering request seeking to filter communications from a particular bulk mailer, may infer that the person or business at that delivery point 106 has no interest in the product or products offered by that bulk mailer. With that information and similar information regarding other delivery points 106, the data mining requester could plan future advertising or announcements, including future bulk mailings, regarding similar products.

In another application, the data stored by the filtering and mining system 108 may be useful in studying the demographics of the United States by zip code or other geographic boundaries. For example, if the filtering and mining system 108 includes data regarding the ages of people residing at the delivery point 106 and other delivery points, a proper data mining request could yield information regarding the age distribution of inhabitants of the areas covered by the data in the filtering and mining system 108.

In addition, the filtering and mining system 108 provides a new source of income for the communications system 102. As discussed above, the communications system 102 optionally receives payment from delivery point 106 for the filtering requests, from the discarded communications repository 112 for the discarded communications, and from the data mining requester 114 for the data mining requests. The payments made by the delivery point 106 for the filtering requests may be made at the time the filtering request is registered or they may be made each time the filtering and mining system 108 filters a communication in accordance with a filtering request from the delivery point 106. Similarly, the filtering and mining system 108 may receive a payment from the data mining requestor 114 when it receives a data mining request or when it delivers the response to the data mining request.

Figure 2:
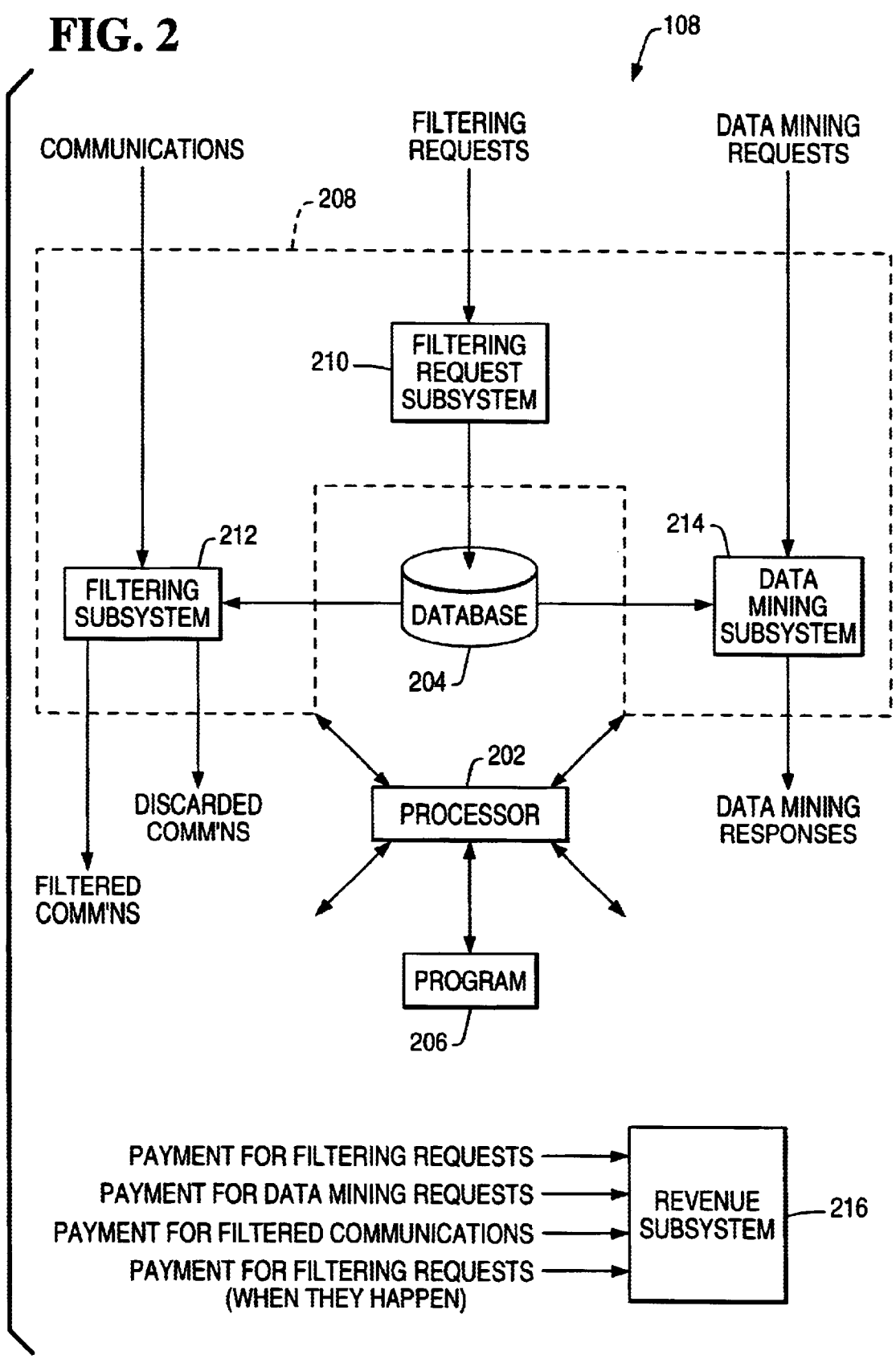
FIG. 2 is a block diagram of a system for mining data from filtering requests.

In general, the data filtering and mining system 108, illustrated in more detail in FIG. 2, includes one or more processors 202 that maintain the database in a storage facility 204, such as an array of magnetic or optical disks. Functions performed by the processor 202 include placing data into the database, removing data from the database, analyzing the database data, generating reports, and delivering the reports to the report requestor.

The processor 202 operates under the control of one or more computer programs 206, each consisting of computer-readable instructions stored on a persistent storage medium, such as a CD-ROM or a hard disk. In executing one of the programs, a computing system copies the instructions from the persistent storage medium into a temporary storage module, such as a random access memory (RAM) chip, and then executes the instructions from there.

The processor 202 coordinates the activities of several subsystems that carry out the functions described above.

Each of the subsystems can be implemented entirely in hardware or entirely in software or a combination of hardware and software. The subsystems may be implemented in a single processor, such as processor 202, or array of processors, as illustrated by box 208, or each may be implemented in a separate processor or array of processors.

A filtering request subsystem 210 receives filtering requests from the delivery point 106 and other delivery points, processes the data contained therein and stores the data in the database on storage facility 204. Once the filtering request subsystem 210 accomplishes its task, the filtering data is available in the database to accomplish the filtering function and to provide data for the data mining function.

A filtering subsystem 212 receives a communication from the communications system 102 and determines the delivery point 106 and sender 104 for the communication. The filtering subsystem 212 uses this information to access the database stored on the storage facility 204 to determine whether the delivery point 106 wishes to receive communications from the sender 104. If it does, the filtering subsystem 212 sends the communication back to the communications system 102 to be delivered to the delivery point 106. Otherwise, the filtering subsystem 212 delivers the discarded communication to the discarded communications repository 112.

A data mining subsystem 214 receives data mining requests from the data mining requestor 114, accesses the database stored on the storage facility 204, processes the data and provides a data mining response to the data mining requestor 114. Accessing the data usually involves performing one or more queries (e.g., SQL-based queries) against the database stored on the storage facility 204. The response to the query or queries is a set or sets of data. Processing the resulting data may be as simple as formatting the results of the query or queries into a report. In some cases, processing may include performing statistical or other types of analyses of the results of the query or queries.

A revenue subsystem 216 optionally receives payments (a) from the delivery point 106 when the filtering and mining system 108 receives filtering requests and/or when it filters communications; (b) from the data mining requestor 114 associated with the data mining request and/or the response to the data mining request; and (c) from the discarded communications repository 112 associated with the discarded communications. The revenue subsystem 216 may be separate from the filtering request subsystem 210, the filtering subsystem 212, and the data mining subsystem, as shown in FIG. 2, or it may be incorporated with one or more of the other subsystems. The revenue subsystem 216 may also issue invoices to the delivery point 106, data mining requestor 114 or discarded communications repository 112.

Figure 3:
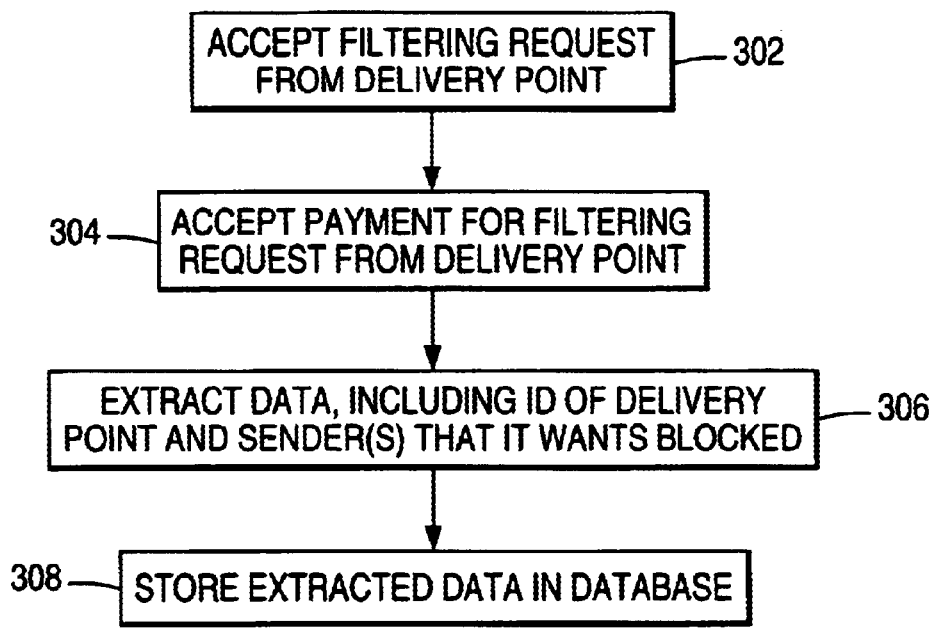
FIG. 3 is a flow chart of a technique for accepting and processing a filtering request from a delivery point.

In operation, the filtering and mining system 108 accepts a filtering request from a delivery point 106 (block 302), as shown in FIG. 3. The filtering and mining system 108 optionally accepts payment from the delivery point 106 for the filtering request (block 304). The filtering and data mining system 108 extracts data from the filtering request (block 306), including the identification of the delivery point 106 and the sender 104 from which the delivery point 106 does not wish to receive communications, and stores the extracted data in the database on storage facility 204 (block 308).

Figure 4:
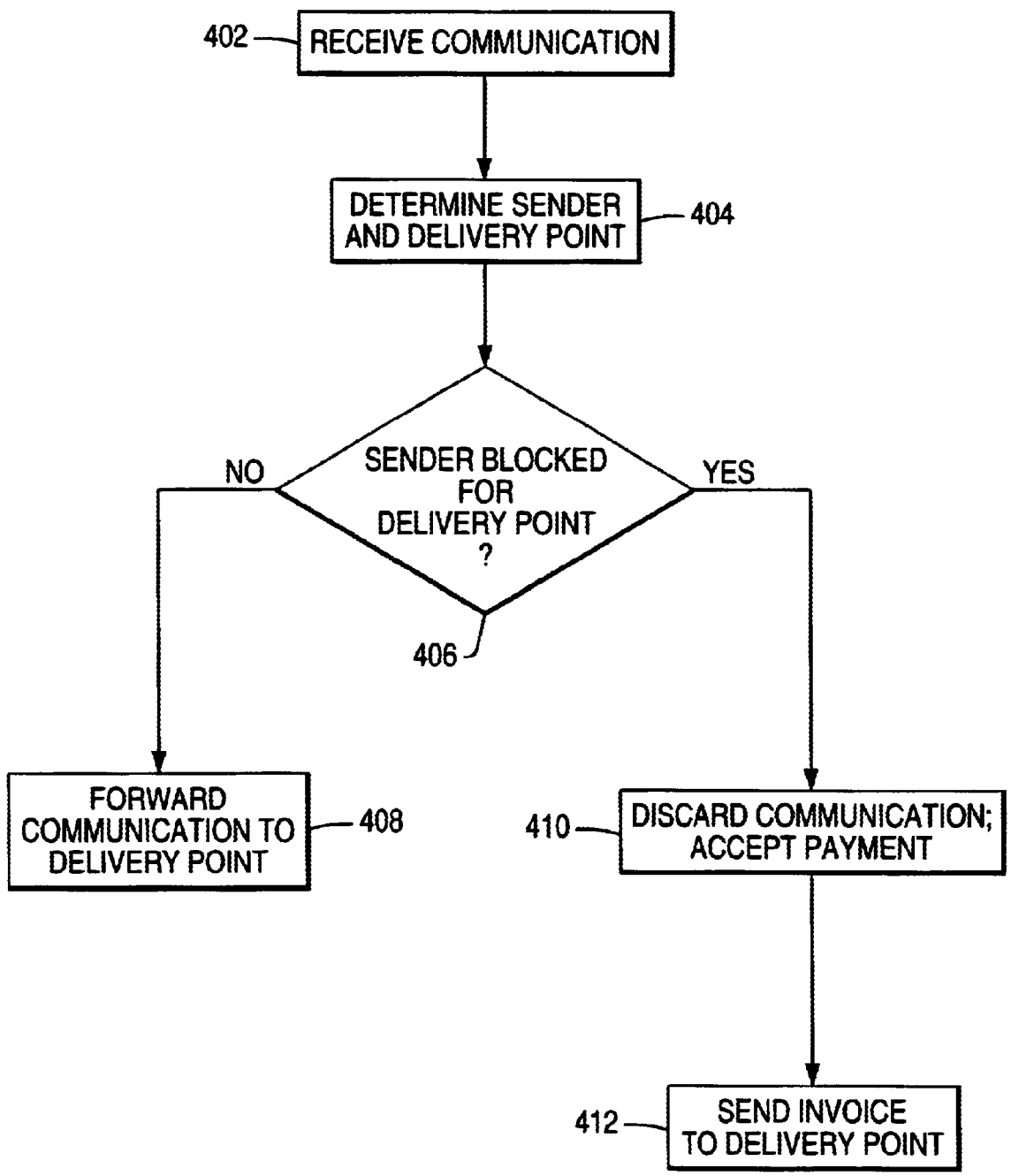
FIG. 4 is a flow chart of a technique for filtering communications.
Figure 7:
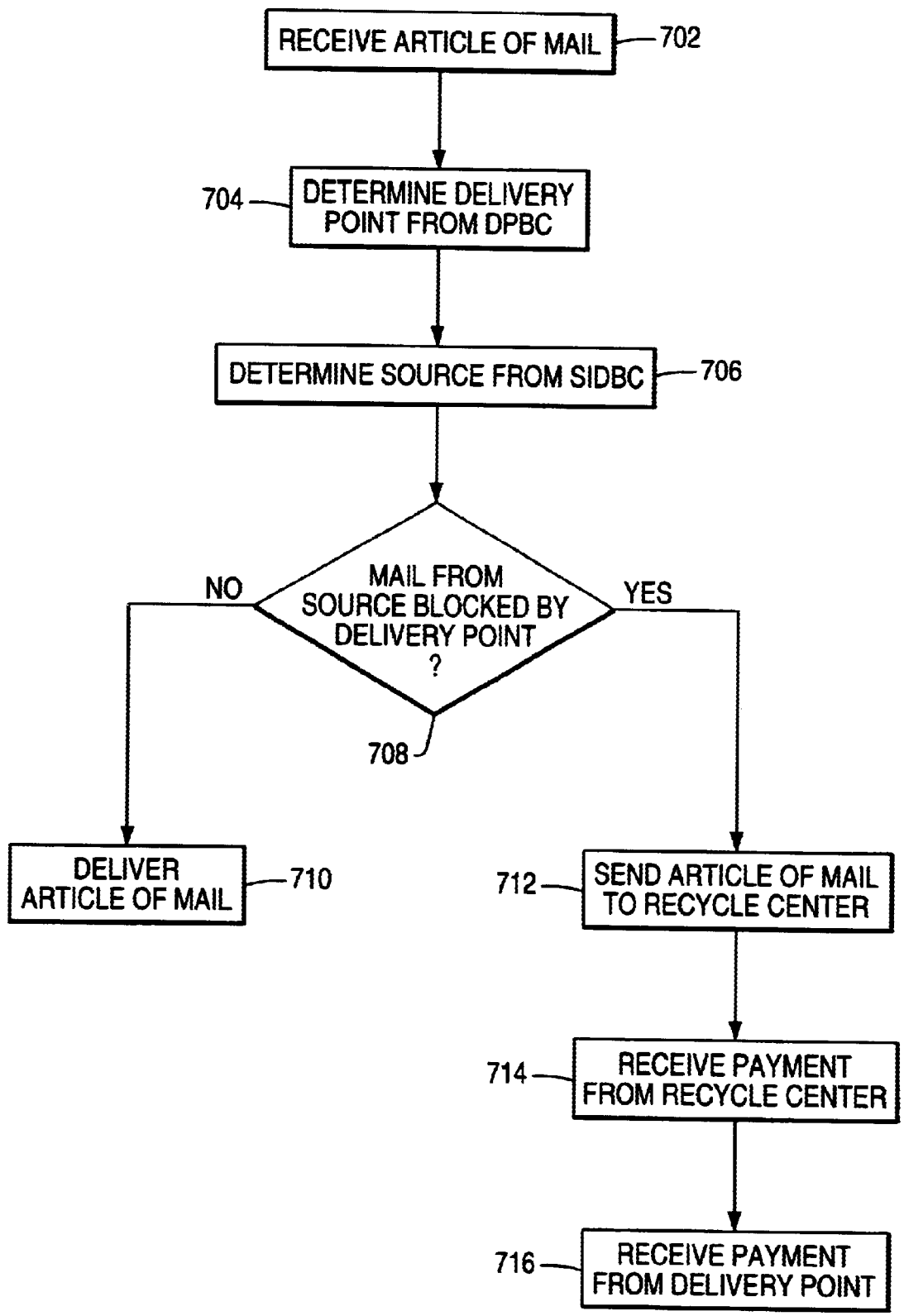
FIG. 7 is a flow chart of a technique for filtering mail.

To perform its filtering function, the filtering and mining system 108 receives a communication (block 402), as shown in FIG. 4. By examining the communication, the filtering and mining system 108 determines the sender 104 and the delivery point 106 (block 404) of the communication. The filtering and mining system 108 then accesses the database stored on storage facility 204 to determine whether communications are blocked from the communication's sender 104 to the communication's delivery point 106 (block 406). If they are not, the filtering and mining system 108 forwards the communication to the delivery point 106 through the communications system 102 (block 408). Otherwise, the filtering and mining system 108 discards the communication by sending it to the discarded communications repository 112 (block 410). Optionally, the filtering and mining system 108 accepts payment from the discarded communications repository 112 (block 410). Also optionally, the filtering and mining system 108 sends an invoice to the delivery point 106 for performing a filtering operation (block 412).

Figure 5:
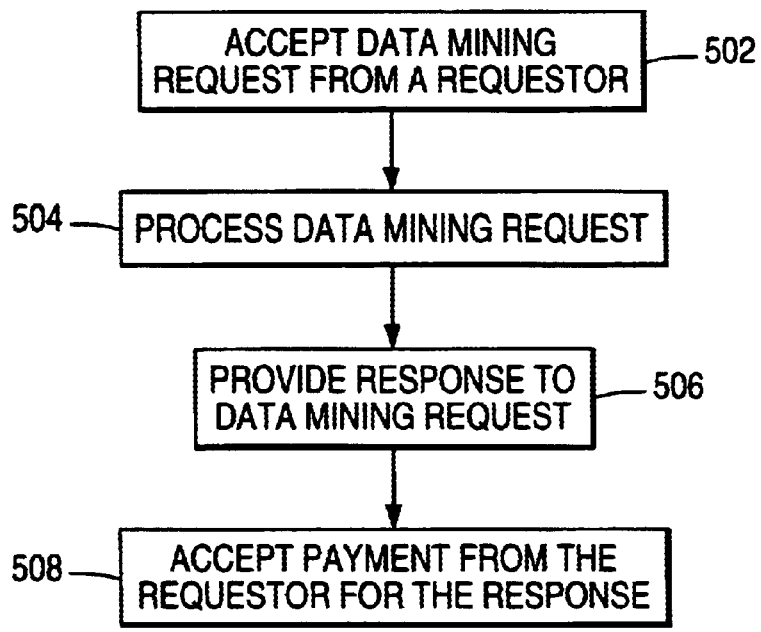
FIG. 5 is a flow chart of a technique for mining data from a database.

To perform its data mining function, the filtering and mining system 108 accepts a data mining request from a data mining requestor 114 (block 502), as shown in FIG. 5. The filtering and mining system 108 processes the data mining request by accessing the database stored on storage facility 204 and analyzing the resulting data in accordance with the data mining request (block 504). The filtering and mining system 108 provides a response to the data mining requestor 114 (block 506) and, optionally, accepts payment from the data mining requestor for the response (block 508).

In the traditional mail system, the delivery point 106 for an article of mail can be determined using a bar code which is affixed to the article of mail by the sender 104 or by the United States Postal Service, as discussed above. The components of the Delivery Point Bar Code (DPBC) 602, shown in FIG. 6, include 62 bars which convey information regarding the address of the delivery point.

A Sender ID Bar Code (SIDBC) 604, shown in FIG. 6, is added to the article of mail by the sender 104 or by the United States Postal Service. The SIDBC identifies the sender 104 in approximately the same way that the DPBC identifies the delivery point 106. The SIDBC is the same size (11 digits in 62 bars) and has a similar format to the DPBC although the size and format of the SIDBC could be anything that accomplish its purpose. The SIDBC and the DPBC are preferably separate bar codes but could be merged into a single bar code.

In the example shown in FIG. 6, the SIDBC includes a six digit sender identification that allows 99,999 sender identifications per 5-digit zip code.

In use, the filtering and mining system 108 receives an article of mail from the mail system (communications system 102) (block 702). The filtering and mining system 108 determines the delivery point 106 of the article of mail from the DPBC (block 704) and the sender 104 of the article of mail from the SIDBC (block 706). The filtering and mining system 108 accesses the database stored on the storage facility 204 to determine whether the delivery point 106 has indicated that it does not wish to receive mail from the sender 104 (block 708). If not, the filtering and mining system 108 sends the article of mail back into the mail system for delivery to the delivery point (block 710). Otherwise, the filtering and mining system 108 sends the article of mail to a recycle center (block 712) and optionally receives payment from the recycle center (block 714). The filtering and mining system 108 also optionally receives payment from the delivery point for the action of filtering the communication (block 716).

The text above describes the invention in terms of one or more specific embodiments. The invention also appears in a variety of alternative embodiments and thus is not limited to the embodiments described above. Accordingly, embodiments other than those described here are within the scope of the following claims.

What is claimed is:

1. A computer-based method for use in mining data from communications filtering requests, the method comprising:

accepting a filtering request from a delivery point, the filtering request comprising an identification of a sender from which the delivery point does not wish to accept communications;

storing the data from the filtering request in a database;

providing to a requestor information from the database;

receiving a communication;

determining from the communication a communication source and the delivery point;

accessing the database to determine if the determined (e livery point wishes to accept communications from the determined source;

if the determined delivery point does, delivering the communication to the delivery point; and if the determined delivery point does not, discarding the communication;

wherein the communication comprises traditional mail and determining the source and delivery point comprises reading one or more bar codes affixed to the communication.

2. The method of claim 1 wherein the communications are one of traditional mail, email, and telephonic communications.

3. The method of claim 1 wherein providing comprises accepting a data mining request from the requestor; and mining data from the database in accordance with the data mining request.

4. The method of claim 3 wherein providing comprises receiving from the requestor payment associated with the data mining request.

5. The method of claim 1 further comprising receiving from the delivery point payment associated with the filtering request.

6. The method of claim 5 wherein the payment is associated with receipt of the filtering request.

7. The method of claim 5 wherein the payment is associated with application of the filtering request.

8. The method of claim 1 wherein the requester is the sender.

9. The method of claim 1 wherein providing comprises querying the database for a list of all delivery points not accepting communications from the requester.

10. The method of claim 1 wherein the communications are traditional mail, further comprising:

sending filtered communications to a recycle facility; and receiving from the recycle facility payment associated with receipt of the filtered communications.

11. A system for mining data from a communications filtering system, the system for mining data comprising a database;

a filtering request interface for receiving a filtering request;

a data mining request interface for receiving a data mining request;

a data mining response interface for transmitting a data mining response;

a processor configured to:

process the filtering request to produce filtering request data;

store at least a portion of the filter request data in the dat abase;

mine the database in accordance with the data mining request to produce a data mining response;

provide the data mining response through the data mining response interface; and a revenue interface configured to receive revenue associated with one or more of the filtering request, the data mining request, the data mining response, and the communications filtering activity.

12. The system of claim 11, wherein the processor is further configured to:

filter communications in accordance with the filtering request.

13. The system of claim 12 further comprising a filtered communications interface through which the processor sends filtered communications.

14. The system of claim 13 wherein the communications comprise traditional mail and the filtered communications interface is to a recycling facility.

15. The system of claim 14 further comprising a revenue interface configured to receive revenue associated with sending the filtered communications to the recycling facility.

16. The system of claim 11 wherein the filtering request comprises an identification by a delivery point of a sender from which the delivery point does not wish to receive communications.

17. The system of claim 11 wherein the filtering request comprises an indication by a delivery point that the delivery point does not wish to receive bulk communications.

18. The system of claim 17 wherein the bulk communications comprise one of bulk mail, bulk email, and bulk telephone calls.

19. The system of claim 11 wherein the filtering request comprises a payment.

20. The system of claim 11 wherein the data mining request comprises a request for information regarding specified delivery points.

21. The system of claim 11 wherein the data mining request comprises a request for an identification of delivery points that have asked not to receive communications from a sender.

22. The system of claim 11 wherein the data mining request comprises a request from a requester of an identification of delivery points that have asked not to receive communications from the requester.

23. The system of claim 11 wherein the data mining request comprises a payment.

24. The system of claim 11 wherein the data mining response comprises a list of delivery points that have asked not to receive communications from a sender.

25. A computer-based method for filtering traditional mail comprising receiving an article of traditional mail;

determining a delivery point from the article of traditional mail;

determining a sender from the article of traditional mail; and discarding the article of traditional mail if the delivery point does not wish to receive traditional mail from the sender;

forwarding the article of traditional mail to the delivery point otherwise;

receiving a data mining request;

accessing a database containing information regarding whether the delivery point wishes to receive traditional mail from the sender, to extract mined data in accordance with the data mining request; and producing a report based on the mined data in accordance with the data mining request.

26. The method of claim 25 wherein determining a sender comprises reading a bar code.

27. The method of claim 26 wherein the bar code comprises a zip code; and a sender identification associated with the zip code.

28. The method of claim 25 further comprising determining whether the delivery point wishes to receive traditional mail from the sender by accessing a database.

29. The method of claim 25 further comprising receiving a filtering request comprising filtering data; and storing at least a portion of the filtering data in a database.

* * * * *

UNITED STATES PATENT AND TRADEMARK OFFICE
CERTIFICATE OF CORRECTION

PATENT NO. : 6,622,909 B1
DATED : September 23, 2003
INVENTOR(S) : Thomas, C. and Reed, M.

It is certified that error appears in the above-identified patent and that said Letters Patent is hereby corrected as shown below:

Column 9,
Line 17, after "determined" delete "e" and insert -- de --.

Column 10,
Line 4, delete "dat" and insert -- data --.
Line 5, delete "abase" and insert -- base --.

Signed and Sealed this

Twenty-seventh Day of December, 2005

JON W. DUDAS
*Director of the United States Patent and Trademark Office*